July 22, 1924.
A. E. PAIGE
STEERING WHEEL
Filed Aug. 19, 1921
1,502,348
3 Sheets-Sheet 1
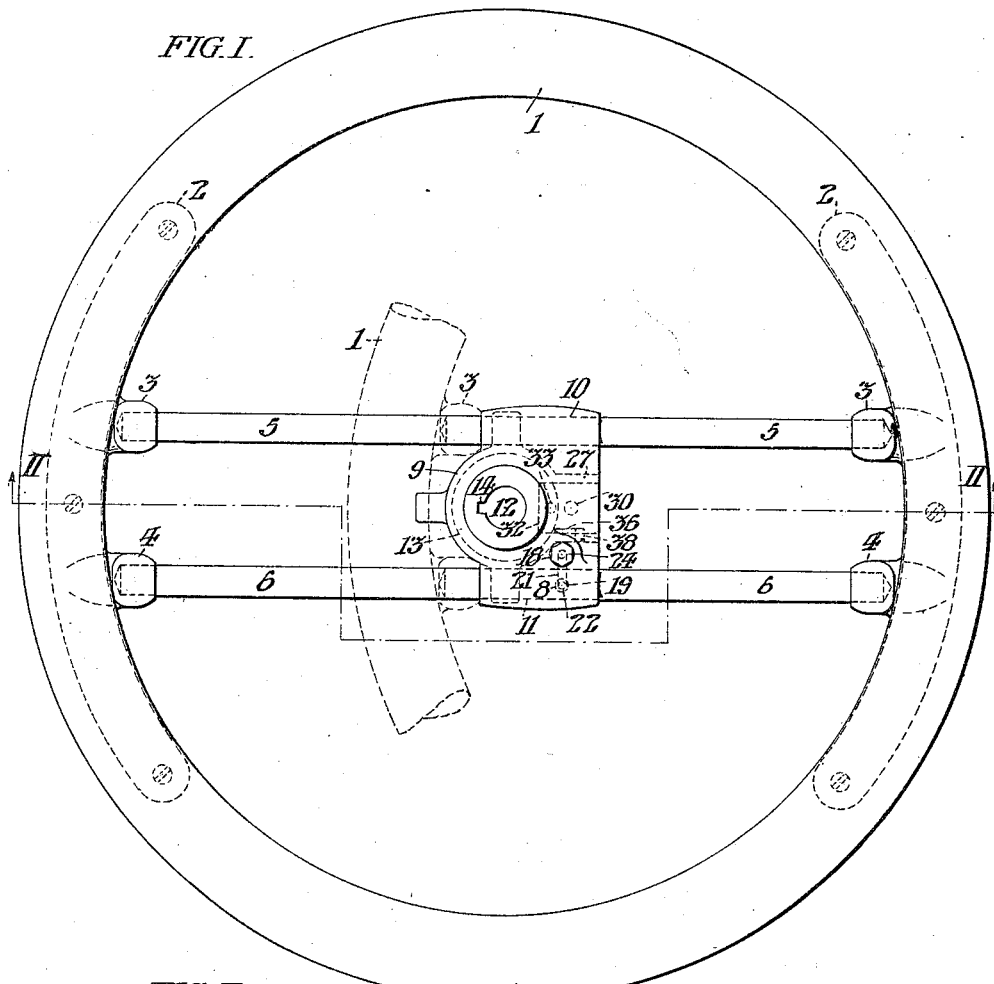
FIG. I.
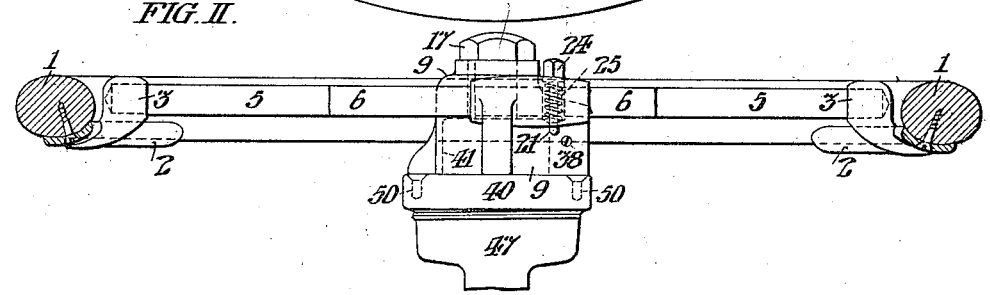
FIG. II.
INVENTOR:
Arthur E. Paige

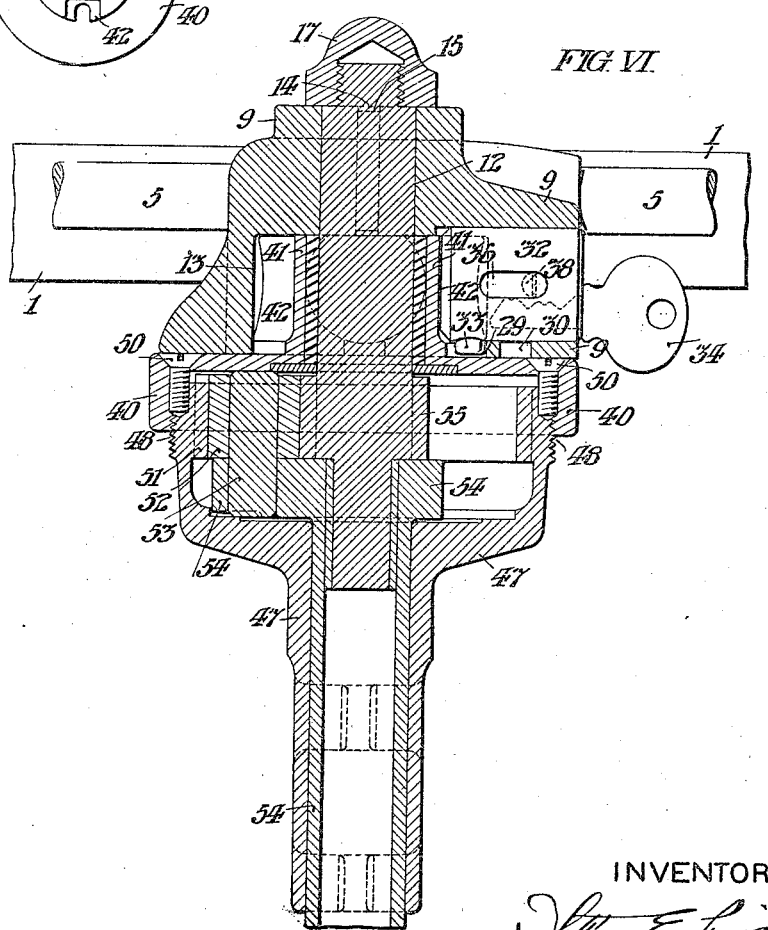

July 22, 1924.
A. E. PAIGE
1,502,348
STEERING WHEEL
Filed Aug. 19, 1921
3 Sheets-Sheet 3
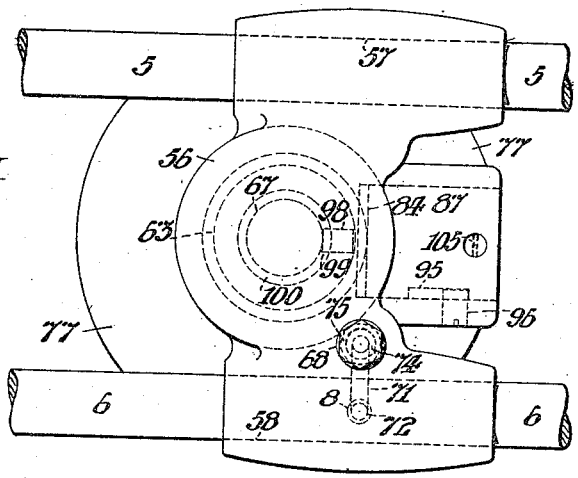
FIG. VII.
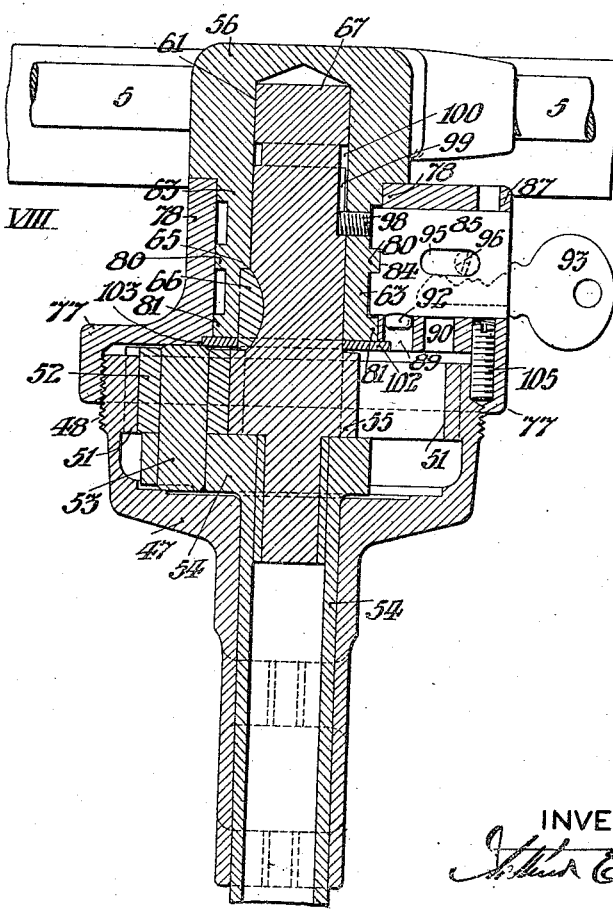
FIG. VIII.
INVENTOR:
Arthur E. Paige Patented July 22, 1924.

1,502,348

UNITED STATES PATENT OFFICE.

ARTHUR E. PAIGE, OF PHILADELPHIA, PENNSYLVANIA.

STEERING WHEEL.

Application filed August 19, 1921. Serial No. 493,631.

*To all whom it may concern:*

Be it known that I, ARTHUR E. PAIGE, a citizen of the United States, residing at Philadelphia, in the State of Pennsylvania, have invented a certain new and useful Improvement in Steering Wheels, whereof the following is a specification, reference being had to the accompanying drawings.

My invention relates to an automotive vehicle steering wheel capable of being shifted with respect to the steering shaft upon which it is mounted, so as to facilitate the ingress and egress of the operator with respect to the chauffeur's seat. It is characteristic of the form of my invention hereinafter described; that said wheel is slidably connected with its hub so as to be capable of radial reciprocation with respect thereto, and said hub is provided with two forms of locking means, one form so constructed and arranged that said wheel is automatically locked in rigid connection with said hub when the wheel is presented in concentric relation with the steering shaft; that locking means being spring pressed and releasable by a manually operative push button when it is desired to shift the wheel eccentrically to its axis. The other locking means are so constructed and arranged that said hub may be shifted axially to and from operative position, (in which position it is rigidly connected with the steering shaft and adapted to turn said shaft,) and inoperative position in which said wheel can only be idly turned on said shaft, without turning the latter; said wheel being lockable both in its operative and inoperative positions, by key-controlled means. However, the construction and arrangement of the latter locking mechanism is the subject matter of Letters Patent of the United States, No. 1,416,413 granted to me May 16, 1922, pursuant to application Serial No. 494,606 filed August 23, 1921, and the claims in this case relate more particularly to the construction and arrangement involved in shifting the wheel radially.

My invention includes the various novel features of construction and arrangement hereinafter more definitely specified.

In said drawings; Fig. I is a plan view of a steering wheel and its appurtenances embodying a convenient form of my invention.

Fig. II is a sectional view of said wheel, taken on the line II, II in Fig. I.

Fig. III is a sectional view of said wheel, taken on the line III, III in Fig. I.

Fig. IV is an elevation of the side face of the wheel hub member which is presented toward the top of the sheet in Fig. I; showing the reciprocatory lock body which is carried by said hub member.

Fig. V is a plan view of the stationary bearing which is indicated in Fig. I; to which said hub may be locked.

Fig. VI is a fragmentary sectional view of said wheel, taken on the line VI, VI in Fig. I.

Fig. VII is a fragmentary plan view of a steering wheel embodying a modified form of my invention, wherein the lock mechanism is mounted in the stationary bearing of the steering shaft, instead of in the hub member of the wheel as in the preceding figures.

Fig. VIII is a vertical sectional view of said steering wheel and its appurtenances, taken on the line VIII, VIII in Fig. VII.

Referring to the form of my invention shown in Figs. I to VI inclusive; the steering wheel includes the annular rim 1 which is conveniently formed of wood or a non-metallic composition. Two similar brackets 2 are mounted on said rim 1 at diametrically opposite sides thereof; each of said brackets having, in unitary relation therewith, two cylindrical sockets 3 and 4; said sockets being parallel with each other in each bracket, and said sockets 3 and 4 in each bracket being respectively in axial alinement with the sockets 3 and 4 in the other bracket. The pair of cylindrical rods 5 and 6 have their opposite ends respectively engaged in said sockets in said brackets and said rods extend in parallel relation with each other from side to side of said rim 1. Said rod 6 has the locking bolt recess 8; whereby said wheel rim is normally secured in concentric relation with the steering shaft as hereinafter described.

The hub member 9 has the pair of cylindrical bores 10 and 11 extending therethrough in parallel relation with each other, and respectively engaging said rods 5 and 6 in slidable relation. Said hub member 9 has the axial bore 12 at right angles to the plane of said rim 1 and arranged for presentation in coaxial relation with said rim, and said hub member has the larger counterbore 13 in concentric relation with said axial bore 12. Said hub member 9 has the keyway 14, fitted to the key 15 of the steering shaft 16, and the nut 17, to retain said shaft in said bore 12 in rigid relation with said hub member 9.

Said hub member 9 has the two locking plunger bores 18 and 19, extending in parallel relation with said axial bore 12; and the J-shaped locking plunger 21 is arranged to reciprocate in said plunger bores 18 and 19; said plunger including the locking bolt 22 arranged to engage said locking bolt recess 8 when the axial bore 12 of said hub member is in concentric relation with the axis of said rim. Said locking plunger 21 has the push cap nut 24, normally extending above said hub member 9 and adapted to reciprocate in said plunger bore 18. The helical spring 25 encircles said plunger 21 within that plunger bore 18 of said hub member, beneath said cap nut 24; whereby said locking plunger 21 is normally spring pressed to engage said locking bolt recess 8 in said rod 6 and retain the wheel in concentric relation with said hub member 9.

Said hub member 9 has, in unitary relation therewith, the lock socket 27, which is cylindrical and extends in radial relation to said axial bore 12. Said lock socket has two circular recesses 29 and 30 extending at right angles to the axis of said socket and, conveniently, parallel with said axial bore 14, but in radially spaced relation. The cylindrical lock body 32 is mounted to reciprocate in said lock socket 27 and includes the locking plunger 33 which is controlled by the key 34 and arranged to be selectively projected into said recesses 29 and 30. Said lock body also has the slot 36 in its circumference, extending parallel with its axis, to limit the extent of the reciprocatory movement of said lock body by engaging with the stop screw 38 which is carried by said hub member and extends within said slot 36, as indicated in dotted lines in Fig. I.

The stationary bearing 40 for said steering shaft 16 includes the sleeve 41 fitted in said counterbore 13 and having a circumferential series of four lock recesses 42 adapted to be selectively engaged by the inner end of said lock body 32 when the latter is in the locked position shown in Fig. VI. Such arrangement permits the operator to lock the vehicle with its dirigible wheels turned to the right or left against a curb to prevent the vehicle from being towed.

Said stationary bearing 40 is conveniently formed as the cover for the gear casing 47, to which it is connected by the screw thread 48. Felonious removal of said cover is prevented by the two screws 50 which extend through said cover 40 in threaded engagement with said casing 47 as shown in Fig. VI. Said screws are covered by said hub member 9 when the latter is locked in inoperative position.

Said gear casing 47 is of the "Ford" type and has the internal gear 51 formed in unitary relation therewith and engaged with three planetary pinions 52 which are mounted to rotate on the studs 53 which are rigidly connected with the drive pinion shaft bushing 54 which is rotatable in said internal gear casing 47. Said three pinions 52 engage the pinion 55 which is conveniently formed in unitary relation with said steering shaft 16. Said gearing serves merely to afford a desired degree of leverage in the transmission of power from said steering wheel to said bushing 54, which is operatively connected with the dirigible wheels of the vehicle.

It is to be understood that the construction and arrangement above described is such; that said rim 1 is normally rigidly retained in concentric relation with said steering shaft 16, by the engagement of said locking plunger 21 with the locking bolt recess 8 in said slide rod 6; but said rim and its rods may be instantly released by manually pushing downward on said locking plunger cap nut 24, so that said rim may be then readily shifted radially with respect to its hub member 9, away from the operator, to such eccentric position with respect to its steering shaft 16, as to afford abnormal space between said wheel and the chauffeur's seat to facilitate the egress and ingress of the operator. Such movement of the wheel rim may be thus instantly effected at any time, regardless of whether the wheel is in operative or inoperative relation with its steering shaft 16 aforesaid.

Moreover, it is to be understood; that the construction and arrangement above described is such that said lock body 32 is normally held in unlocked position in said hub member 9, by the engagement of said locking plunger 33 in the circular locking recess 30; in which position, said hub member 9 may be turned by said rim 1 to operate the steering mechanism of the vehicle, without restriction.

However, when it is desired to lock the steering wheel and its appurtenances, shown in Figs. I to VI inclusive, so that it is incapable of operating the steering mechanism; said shaft 16 is temporarily held against turning movement; by turning the key 34 to retract the locking plunger 33 from said recess 30, whereupon, said lock body 32 is thrust inwardly to engage one of the circumferential series of four lock recesses 42, in said stationary bearing 40, corresponding with the position in which it is desired to hold the front dirigible wheels of the vehicle, i. e., either straight ahead, in which position the vehicle may be towed, or with said vehicle wheels turned, to the right or left, against a curb or other obstruction, to prevent the vehicle from being towed. Said lock body 32 is temporarily detained in such locked position by the projection of its locking plunger 33 into said recess 29 in said hub member 9.

It may be observed, that in the form of my invention above described, all of the leverage of the steering wheel is available to feloniously attack the locking means in attempts to disrupt the latter, to release the vehicle so that it may be stolen. Therefore, there is a demand for wheels which may be locked in operative and inoperative position with respect to the steering mechanism, without leaving the wheel in such relation to the locking mechanism that its leverage may be used in any attempt destroy the locking mechanism. Therefore, I have embodied the construction and arrangement above described, which is involved in shifting the wheel radially, in connection with locking means of the latter character, typified in Figs. VII and VIII.

Referring to the form of my invention shown in Figs. VII and VIII; the hub member 56 has the pair of cylindrical bores 57 and 58 extending therethrough in parallel relation with each other, and respectively engaging rods 5 and 6 in slidable relation. Said hub member 56 has the axial bore 61 at right angles to the plane of the wheel rim 1 and arranged for presentation in coaxial relation with said rim, as above described, and said hub member 56 has the axial tubular sleeve 63 in concentric relation with said axial bore 61 and provided with means, including the key way 65, arranged to slidably engage the key 66, in the steering shaft 67, to hold said hub member 56 in operative relation with said shaft, when said hub member is lowered to the position shown in Fig. VIII. Said hub member 56 has two locking plunger bores 68 and 69 in parallel relation with said axial bore 61, and the J-shaped locking plunger 71 is engaged to reciprocate in said plunger bores 68 and 69; said plunger including the locking bolt 72 arranged to engage said locking bolt recess 8 when the axial bore 61 of said hub member 56 is in concentric relation with the axis of said rim 1. Said locking plunger 71 has the push cap nut 74, normally extending above said hub member 56 and adapted to reciprocate in said plunger bore 68. The helical spring 75 encircles said plunger 71 within that bore 68 beneath said cap nut 74; whereby said locking plunger 71 is normally spring pressed to engage said locking bolt recess 8 in said rod 6 and retain the wheel in concentric relation with said hub member 56. Said nut 74 may be pushed to release the wheel from said hub 56 and permit it to be slid to and from concentric relation with the steering shaft like the other construction above described.

The stationary bearing 77 for said steering shaft 67 includes the tubular flange 78 in concentric relation with said shaft and in which said tubular sleeve 63 is journaled, and said sleeve 63 has two annular ribs 80 and 81 in axially spaced relation, adapted to be selectively engaged in the transverse groove 84 in the inner end of the lock body 85 which is mounted to reciprocate radially with respect to said shaft 67 in the lock socket 87, which is in unitary relation with said stationary bearing 77. Said lock socket 87 has two circular recesses 89 and 90, extending at right angles to the axis of said socket and, conveniently, parallel with said axial sleeve 63, but in radially spaced relation. Said lock body 85 includes the locking plunger 92, which is controlled by the key 93, and arranged to be selectively projected into said recesses 89 and 90. Said lock body 85 also has the slot 95 in its circumference, extending parallel with its axis, to limit the extent of the reciprocatory movement of said lock body, by engagement with the stop screw 96 which is carried by said stationary bearing 77 and extends within said slot 95, as indicated in dotted lines in Fig. VIII. Said hub member 56 is thus retained in cooperative relation with said steering shaft 67 by the engagement of the annular rib 80 in the transverse groove 84 in the inner end of said lock body 85. However, when said rib 80 is disengaged by said lock body 85; said hub member 56 may be raised to present its rib 81 in registry with said groove 84, the extent of such axial movement of said hub 56 with respect to said steering shaft 67 being limited by the set screw 98 which extends through said sleeve 63, in such position that it is accessible through said lock socket 87. Said screw 98 projects into the slot 99 which extends longitudinally in said steering shaft 67, and terminates in the annular groove 100 in said shaft; so that, when said steering hub 56 is raised to present its rib 81 in registry with said groove 84 in the lock body; said screw 98 is presented in registry with said groove 100 and said hub 56 is then free to turn idly with respect to said shaft 67. Said shaft 67 is prevented from axial movement when said bearing 77 is in its normal position, by the washer 102 which encircles said shaft 67, holds said key 66 in said shaft, and bears upon the under side of said stationary bearing 77, in the recess 103 of the latter. Removal of said bearing 77 from said casing 47 is normally prevented by the screw 105, which is covered by said lock body 85 when the latter is in the locked position shown.

It is to be understood that the construction and arrangement above described with reference to Figs. VII and VIII is such that said lock body 85 is normally held in locked position in said stationary bearing 77 by the engagement of said locking plunger 92 in the circular locking recess 89; in which position, said hub member 56 may be turned by said rim 1 to operate the steering mechanism of the vehicle, without restriction.

However, when it is desired to lock the steering wheel and its appurtenances, shown in Figs. VII and VIII, so that it is incapable of operating the steering mechanism; said plunger 92 is retracted by said key 93, and said lock body 85 withdrawn to disengage said annular rib 80 and permit said hub member 56 to be raised to disengage said key 66 in said steering shaft 67, and thus permit said hub to be turned idly upon said shaft. Said hub is then locked in that idle position by again thrusting said lock body 85 inwardly, but, into engagement with the annular rib 81 on the tubular sleeve 63 of said hub member 56.

It may be observed, that in each form of my invention above described, the two cylindrical rods form the sole support for the rim in connection with the hub; said rods serving as spokes whereon said rim may be slid to and from coaxial and eccentric relation to the steering shaft. Such construction and arrangement not only lessen the cost of manufacture of my invention as compared with structures of the prior art, which include spoked spider frames, but further facilitate the manufacture, because the rods are axially adjustable with respect to their brackets, thus permitting the opposite brackets upon the rims to be precisely fitted to the latter regardless of such differences in diameter of such rims, of the same nominal size, as are inevitable in view of the shrinkage of the wood or similar fibrous material of which such rims are ordinarily made.

As far as I am aware; it is broadly new to provide an automotive vehicle steering shaft with a steering wheel which may be shifted both to and from concentric relation therewith by sliding movement of the wheel rim with respect to its hub and also be shifted from operative to inoperative relation with said shaft, and be locked in both its operative and inoperative positions. My improved means for mounting a wheel rim on a hub so that it can be moved to and from eccentric and concentric relation with the steering shaft, and the means for operatively connecting and disconnecting the hub with respect to the steering shaft, are cooperatively related in that the latter permits the operator to determine the direction of movement of the former. For instance, to facilitate the ingress and egress of the operator with respect to his seat, it is sufficient to permit movement of the wheel longitudinally with respect to the vehicle and, consequently, at right angles to said seat and, therefore, it is convenient to have the rods 5 and 6 extending longitudinally with respect to the vehicle when the dirigible wheels are pointing in the same direction. However, to facilitate access to the vehicle mechanism beneath the floor in front of such seat; it is desirable to permit the steering wheel 1 to be shifted to the right or left with respect to the steering shaft 12, without turning the latter and, consequently, turning the vehicle wheels, and the cooperation of the two means aforesaid affords that advantage. However, although I have shown locking means especially designed to conform to the "Ford" type of construction; it is to be understood that my invention is adapted for embodiment in connection with automotive vehicles of any kind, provided with a steering wheel.

Therefore, I do not desire to limit myself to the precise details of construction and arrangement herein set forth, as it is obvious that various modifications may be made therein, without departing from the essential features of my invention, as defined in the appended claims.

I claim:

1. In a steering wheel; the combination with an annular rim; of two similar brackets mounted on said rim at diametrically opposite sides thereof; each of said brackets having, in unitary relation therewith, two cylindrical sockets; said sockets being parallel with each other in each bracket and said sockets in each bracket being in axial alinement with the sockets in the other bracket; a pair of cylindrical rods having their opposite ends respectively engaged in said brackets and extending in parallel relation with each other from side to side of said rim; one of said rods having a locking bolt recess; a hub member, having a pair of cylindrical bores extending therethrough in parallel relation with each other and respectively engaging said rods in slidable relation; said hub member having an axial bore, at right angles to the plane of said rim and arranged for presentation in coaxial relation with said rim; said hub member having means arranged to retain a steering shaft in said bore in operative relation with said hub member; said hub member having two locking plunger bores, in parallel relation with said axial bore, and a J-shaped locking plunger, arranged to reciprocate in said plunger bores, and including a locking bolt arranged to engage said locking bolt recess when the axial bore of said hub member is in concentric relation with the axis of said rim; said locking plunger having a push cap nut, normally extending above said hub member, and adapted to reciprocate in one of said plunger bores; and a helical spring encircling said plunger, within that plunger bore of said hub member, beneath said cap nut; whereby said locking plunger is normally spring pressed to engage said locking bolt recess in said rod and retain said wheel rim in concentric relation with said hub member.

2. In a steering wheel; the combination with an annular rim; of two similar brackets mounted on said rim at diametrically opposite sides thereof; each of said brackets having, in unitary relation therewith, two cylindrical sockets; said sockets being parallel with each other in each bracket and said sockets in each bracket being in axial alinement with the sockets in the other bracket; a pair of cylindrical rods having their opposite ends respectively engaged in said brackets and extending in parallel relation with each other from side to side of said rim; one of said rods having a locking bolt recess; a hub member, having a pair of cylindrical bores extending therethrough in parallel relation with each other and respectively engaging said rods in slidable relation; said hub member having an axial bore, at right angles to the plane of said rim and arranged for presentation in coaxial relation with said rim; said hub member having means arranged to retain a steering shaft in said bore in operative relation with said hub member; and said hub member having a spring pressed locking bolt arranged to automatically engage said locking bolt recess when the axial bore of said hub member is in concentric relation with the axis of said rim; said locking plunger having pushable means whereby it may be disengaged from said recess.

3. In a steering wheel; the combination with an annular rim; of two brackets mounted on said rim at opposite sides thereof; each of said brackets having two sockets; said sockets being parallel with each other in each bracket and said sockets in each bracket being in axial alinement with the sockets in the other bracket; a pair of cylindrical rods having their opposite ends respectively engaged in said brackets and extending in parallel relation with each other from side to side of said rim; one of said rods having a locking bolt recess; a hub member, having a pair of cylindrical bores extending therethrough in parallel relation with each other and respectively engaging said rods in slidable relation; said hub member having an axial bore, at right angles to the plane of said rim and arranged for presentation in coaxial relation with said rim; said hub member having means arranged to retain a steering shaft in said bore in operative relation with said hub member; and said hub member having releasable means arranged to detain said rim in concentric relation to said hub member.

4. In a steering wheel; a combination with an annular rim; of separate brackets mounted on said rim at opposite sides thereof; a pair of cylindrical rods having their opposite ends respectively engaged in said brackets and extending in parallel relation with each other from side to side of said rim; a hub member, having a pair of cylindrical bores extending therethrough in parallel relation with each other and respectively engaging said rods in slidable relation; and said hub member having means arranged to engage a steering shaft in coaxial relation with said rim; whereby said rods form the sole support for said rim in connection with said hub, whereon said rim may be slid to and from coaxial and eccentric relation to said shaft.

5. In a steering wheel; the combination with an annular rim; of a pair of cylindrical rods extending in parallel relation with each other from side to side of said rim; a hub member, having a pair of cylindrical bores extending therethrough in parallel relation with each other and respectively engaging said rods in slidable relation; whereby said rods serve as spokes for said rim; and spring pressed means arranged to detachably engage one of said rods and detain said rim in concentric relation with said hub.

6. In a steering wheel; the combination with an annular rim; of a pair of rods extending in parallel relation with each other from side to side of said rim; a hub member, having a pair of cylindrical bores extending therethrough in parallel relation with each other and respectively engaging said rods in slidable relation; whereby said rods form the sole support for said rim in connection with said hub; and means arranged to detachably detain said rim in concentric relation with said hub.

7. In a steering wheel; the combination with an annular rim; of two separate rods extending from side to side of said rim; a hub member, having an axial bore for a steering shaft and a pair of cylindrical bores extending therethrough, transversely to said axial bore, and in parallel relation with each other and respectively engaging said rods in slidable relation; whereby said rods form the sole support for said rim in connection with said hub, whereon said rim is adjustable radially to and from concentric and eccentric relation to said shaft.

8. In a steering wheel; the combination with an annular rim; of two separate rods extending from side to side of said rim; a hub member, having an axial bore for a steering shaft and a pair of cylindrical bores extending therethrough, transversely to said axial bore, and in parallel relation with each other and respectively engaging said rods in slidable relation; whereby said rods form the sole support for said rim in connection with said hub, whereon said rim is adjustable radially to and from concentric and eccentric relation to said shaft; and means arranged to lock said wheel in concentric relation with said shaft.

In testimony whereof, I have hereunto signed my name at Philadelphia, Pennsylvania, this 18th day of August, 1921.

ARTHUR E. PAIGE.

Witnesses:
FRANK E. PAIGE,
CAROLYN E. REUTER.